US012726094B2

(12) United States Patent
Umetsu et al.

(10) Patent No.: US 12,726,094 B2
(45) Date of Patent: Sep. 1, 2026

(54) METHOD FOR MANUFACTURING A WIRING COMPONENT

(71) Applicant: Proterial, Ltd., Tokyo (JP)

(72) Inventors: Jun Umetsu, Tokyo (JP); Noriyuki Takahashi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 251 days.

(21) Appl. No.: 18/472,822

(22) Filed: Sep. 22, 2023

(65) Prior Publication Data

US 2024/0113602 A1 Apr. 4, 2024

(30) Foreign Application Priority Data

Sep. 30, 2022 (JP) ................................ 2022-157377

(51) Int. Cl.
*H01F 7/06* (2006.01)
*H02K 15/12* (2006.01)
*H02K 15/33* (2025.01)

(52) U.S. Cl.
CPC ............ *H02K 15/33* (2025.01); *H02K 15/12* (2013.01)

(58) Field of Classification Search
CPC ......... H02K 15/12; H02K 15/33; H02K 5/225
See application file for complete search history.

(56) References Cited

U.S. PATENT DOCUMENTS 11,705,254 B2 * 7/2023 Takahashi ............ H02G 3/0456 174/135

FOREIGN PATENT DOCUMENTS

JP 2002-075291 A 3/2002
JP 2020-011481 A 1/2020
JP 2021141642 A * 9/2021

OTHER PUBLICATIONS

"Notice of Reasons for Refusal" Office Action issued in JP 2022-157377; mailed by the Japanese Patent Office on Feb. 3, 2026.

* cited by examiner

*Primary Examiner* — Paul D Kim
(74) *Attorney, Agent, or Firm* — Studebaker Brackett PLLC

(57) ABSTRACT

A wiring component is provided with a plurality of electric wires, and a holding portion that batch holds respective portions of the plurality of electric wires. The holding portion includes a holder that supports the plurality of electric wires in a predetermined positional relationship, and a resin mold portion composed of resin molded to cover the holder and the respective portions of the plurality of electric wires. The holder includes a substrate portion and a plurality of wire-holding portions formed protruding from the substrate portion. The plurality of electric wires are supported by the plurality of wire-holding portions, respectively. A notch or a through-hole is formed in the substrate portion corresponding to a portion into which molten resin is injected when forming the resin mold portion.

6 Claims, 9 Drawing Sheets

FIG. 4
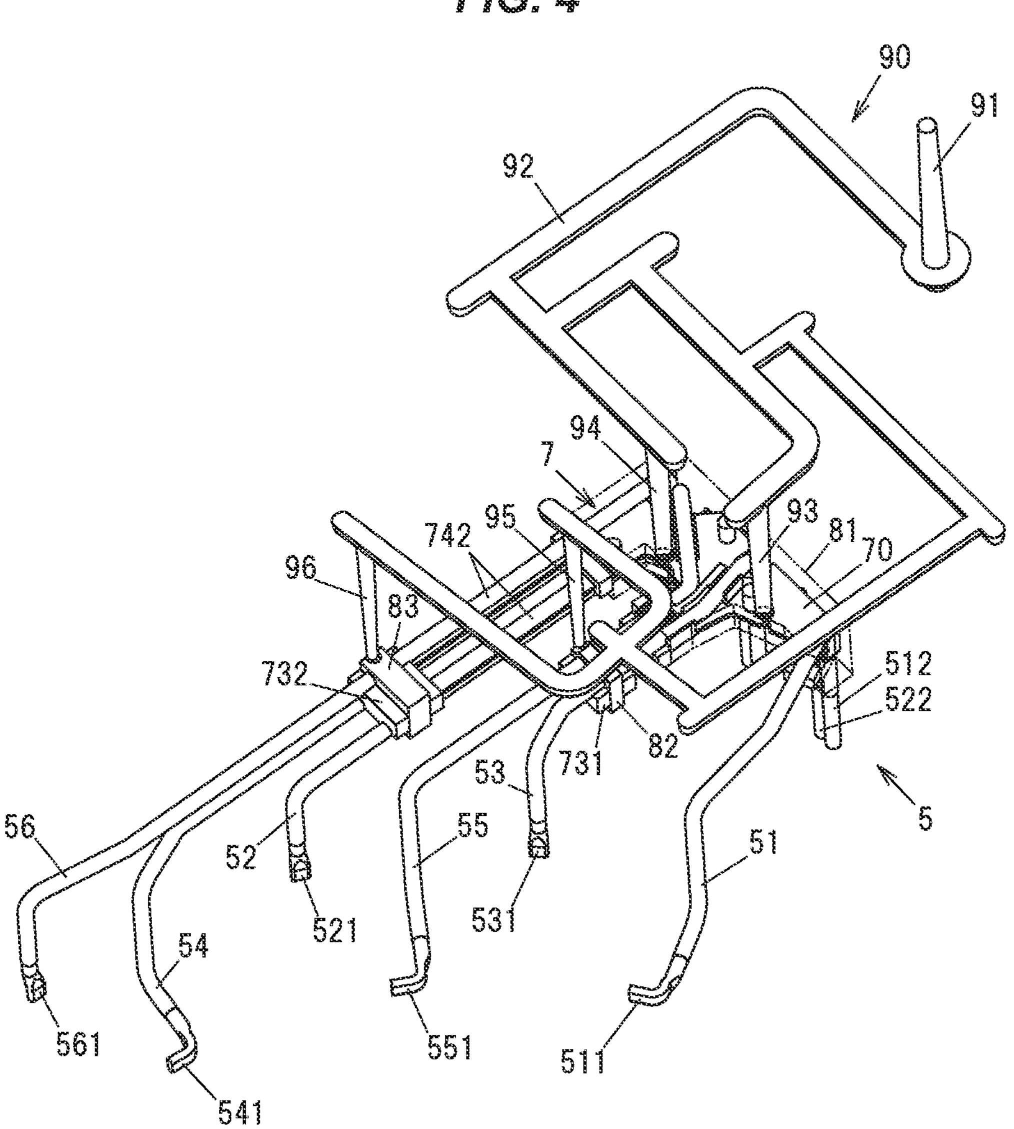

METHOD FOR MANUFACTURING A WIRING COMPONENT

CROSS-REFERENCE TO RELATED APPLICATIONS

The present application is based on Japanese patent application No. 2022-157377 filed on Sep. 30, 2022, the entire contents of which are incorporated herein by reference.

TECHNICAL FIELD

This invention relates to a wiring component to be used, e.g., in the wiring of a rotating electric machine and a method for manufacturing the same.

BACKGROUND OF THE INVENTION

Conventionally, a wiring component in which a plurality of electric wires are held together by a resin holding portion is used to connect, for example, an electrode of a drive motor of an electric vehicle to a terminal block. The Applicant of the present application includes proposed such a wiring component as described in Patent Literature 1. This wiring component includes a plurality of electric wires and a holding portion that holds the plurality of electric wires in a connected state. The holding portion includes a holder that holds the plurality of electric wires in a predetermined wiring shape and a resin mold portion composed of a resin mold to cover the holder and a portion of the plurality of electric wires.

Citation List Patent Literature 1: JP2021-141642A

SUMMARY OF THE INVENTION

In the wiring component as described above, when the holder moves or bends and distorts in the cavity of a mold due to the flow pressure of the molten resin injected into the cavity of the mold when forming the resin mold portion, the electric wires held in the holder may be displaced or tilted accordingly. Products with such misalignment or tilting of electric wires must be discarded depending on the extent of the misalignment or tilting, which causes costs to rise due to deteriorating yields.

It is, therefore, an object of the present invention to provide a wiring component capable of suppressing movement and distortion of the holder due to the flow pressure of the molten resin, and a method for manufacturing the wiring component.

To achieve the object described above, one aspect of the invention provides a wiring component comprising:

- a plurality of electric wires; and
- a holding portion that batch holds respective portions of the plurality of electric wires, the holding portion comprising a holder that supports the plurality of electric wires in a predetermined positional relationship, and a resin mold portion composed of resin molded to cover the holder and the respective portions of the plurality of electric wires,
- wherein the holder comprises a substrate portion and a plurality of wire-holding portions formed protruding from the substrate portion,
- wherein the plurality of electric wires are supported by the plurality of wire-holding portions, respectively,
- wherein a notch or a through-hole is formed in the substrate portion corresponding to a portion into which molten resin is injected when forming the resin mold portion.

To achieve the object described above, another aspect of the invention provides a method for manufacturing a wiring component including a plurality of electric wires and a holding portion including a holder supporting the plurality of electric wires in a predetermined positional relationship and molded with resin covering respective portions of the plurality of electric wires, the method comprising:

- a placement step for placing the plurality of electric wires and the holder in a cavity of a mold; and
- a molding step for injecting molten resin into the cavity to perform the molding, wherein the holder including a substrate portion and a plurality of wire-holding portions formed protruding from the substrate portion and formed with a notch or a through-hole in the substrate portion is used as the holder,
- wherein the plurality of electric wires are supported by the plurality of wire-holding portions in the placement step, and the molten resin is injected toward a portion where the notch or the through-hole is formed in the molding step.

Advantageous Effects of the Invention

According to the wiring component and the method for manufacturing the same, it is possible to suppress movement and distortion of the holder due to the flow pressure of the molten resin when forming the resin mold portion.

BRIEF DESCRIPTION OF DRAWINGS

FIG. 4 is a configuration diagram showing a flow path of molten resin in a mold for forming the resin mold portion together with the wiring component.

DETAILED DESCRIPTION OF THE INVENTION

Embodiment

Figures 1A, 1B:
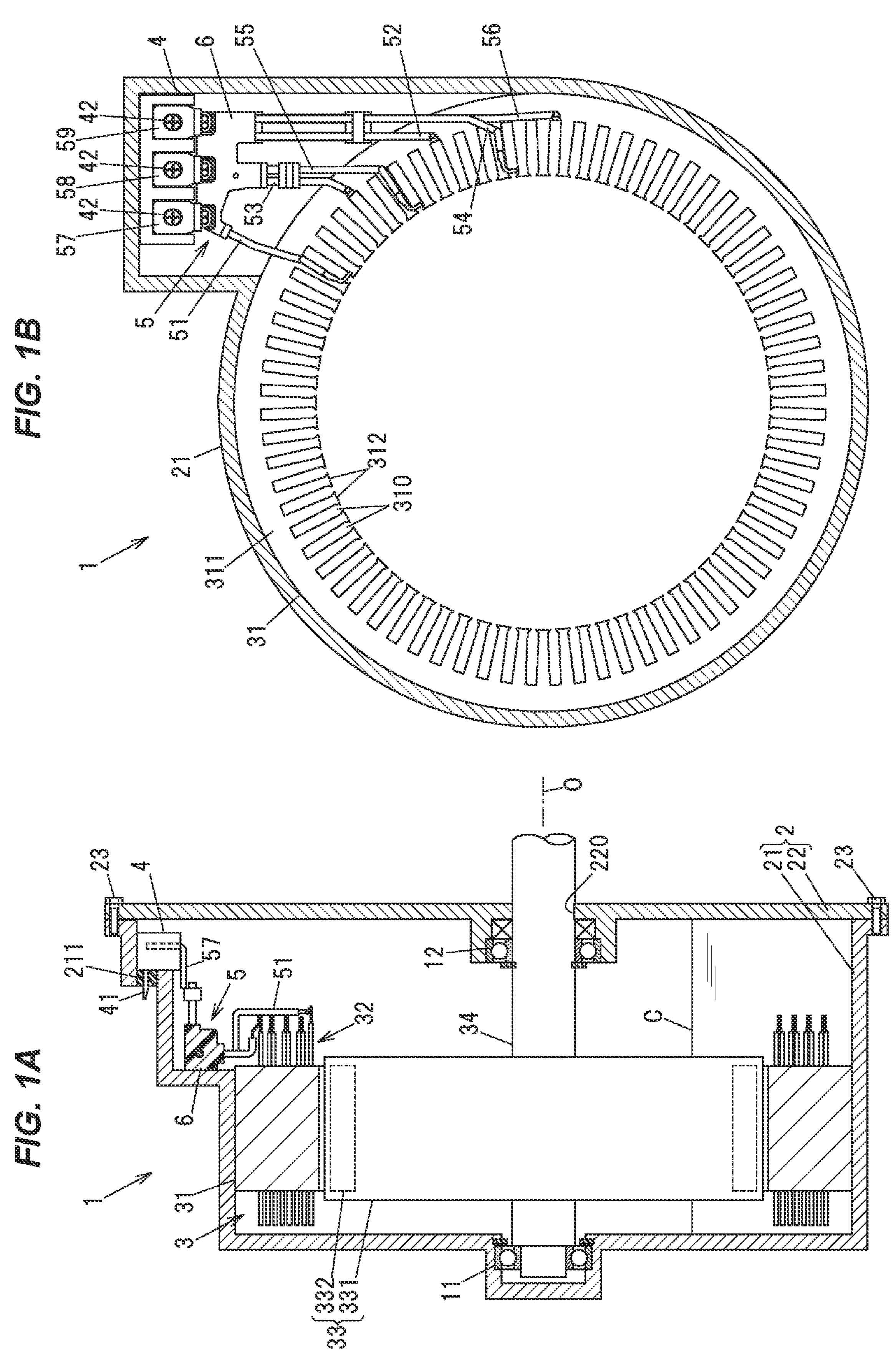
FIGS. 1A and B are configuration diagrams of a rotating electric machine in which a wiring component according to one embodiment of the present invention is used.

FIGS. 1A and B are configuration diagrams showing a rotating electric machine in which a wiring component according to one embodiment of the present invention is used. This rotating electric machine 1 is mounted on, e.g., a vehicle, and is used as a drive source to drive the wheels, but it can also function as a generator that generates electricity by regenerating the rotational force of the wheels.

The rotating electric machine 1 includes, as its main elements, a housing 2, an electric motor 3, a terminal block 4, and a wiring component 5. The electric motor 3, terminal block 4, and wiring component 5 are housed in the housing 2. The housing 2 includes a housing body 21, and a housing lid 22, and the housing lid 22 is fastened to the housing body 21 by a plurality of bolts 23.

The electric motor 3 includes a stator core 31 fixed to the housing body 21, coil windings 32 which generate a magnetic field in the stator core 31, a rotor 33 with a plurality of magnets 332 embedded in the rotor core 331, and a shaft 34 that rotates together with the rotor 33. The shaft 34 is rotatably supported by bearings 11, 12 held in the housing 2 and rotates about a rotation axis O. The housing lid 22 includes an insertion hole 220 through which the shaft 34 is inserted. The housing 2 contains a cooling liquid C for cooling the electric motor 3. In this embodiment, the cooling liquid C is oil and the electric motor 3 is configured as an oil-cooled motor.

The stator core 31 includes a cylindrical back yoke 311, and a plurality of teeth 312 protruding radially inward from the back yoke 311. In this embodiment, seventy-two teeth 312 are provided at equal intervals in a circumferential direction, and a slot 310 is formed between adjacent teeth 312 in the circumferential direction. U-phase, V-phase, and W-phase motor currents are supplied to the coil winding 32. The coil winding 32 and the rotor 33 are not shown in FIG. 1B.

The terminal block 4 is composed of three terminals and fixed to the housing body 21. A pin 41 of each terminal is inserted into a gasket 211 attached to the housing body 21 and protrudes outside the housing 2. The wiring component 5 is located between the terminal block 4 and the electric motor 3. The U-, V-, and W-phase motor currents are supplied to the coil windings 32 of the electric motor 3 through the terminal block 4 and the wiring component 5.

Figure 2A:
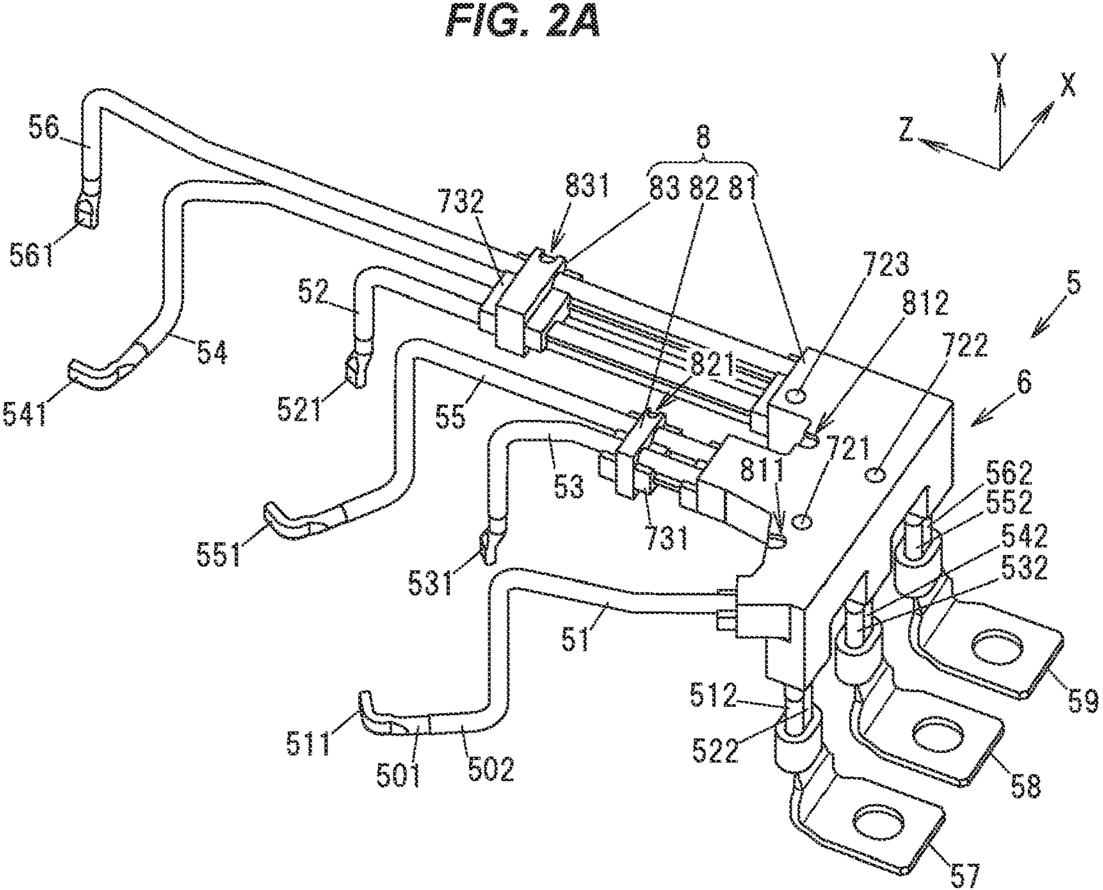
FIG. 2A is a perspective view of the wiring component.
Figure 2B:
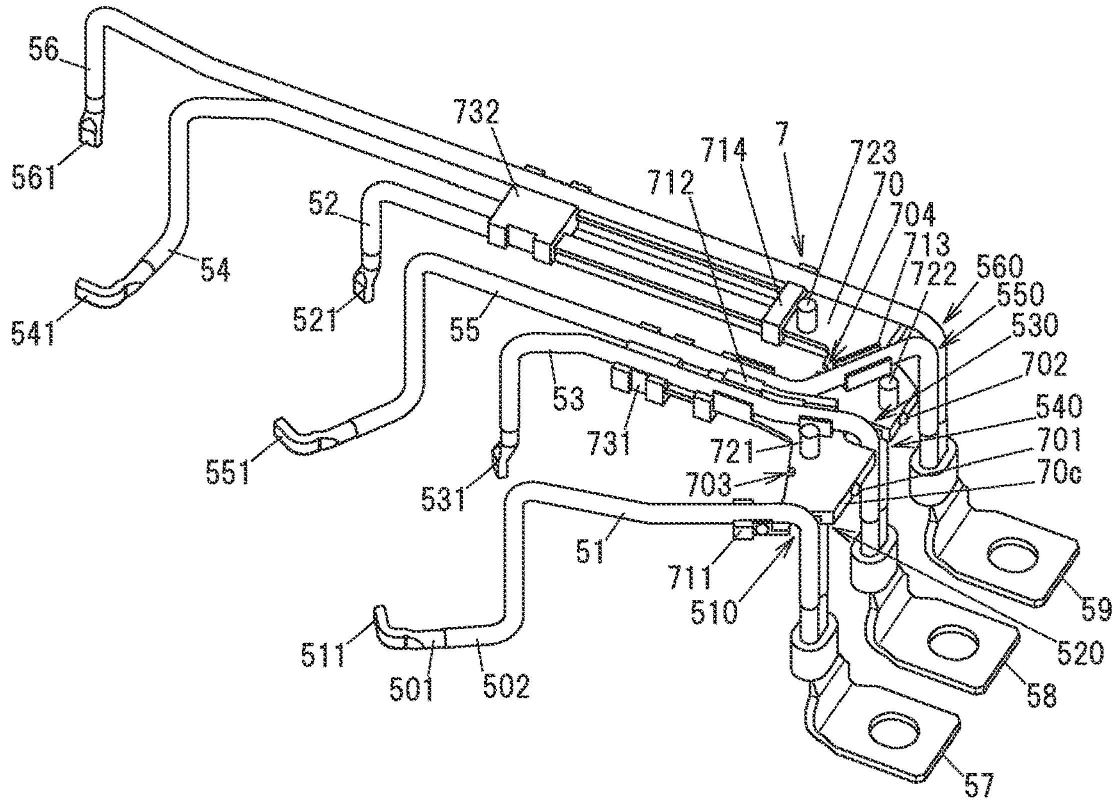
FIG. 2B is a perspective view of the wiring component without showing a resin mold portion.

FIG. 2A is a perspective view of the wiring component 5. FIG. 2B is a perspective view of the wiring component 5 in which a resin mold portion 8, to be described below, is omitted.

The wiring component 5 includes first to sixth wires 51 to 56, first to third terminals 57 to 59, and a holding portion 6 that batch holds portions of the first to sixth wires 51 to 56. The holding portion 6 includes a holder 7 that supports the first to sixth wires 51 to 56 in the predetermined positional relationship shown in FIG. 2B, and a resin mold portion 8 that is molded with resin to cover the holder 7 and the portions of the first to sixth wires 51 to 56. The holder 7 and the resin mold portion 8 are made of, e.g., thermoplastic resin such as PPS (polyphenylene sulfide).

The first to third terminals 57 to 59 are connected to the terminal block 4 by bolts 42, respectively, as shown in FIG. 1B. The first through third terminals 57 to 59 are supplied with U-, V-, and W-phase currents, respectively, from a control unit (not shown).

The first to sixth wires 51 to 56, each of which includes a conductor 501 made of a good electrically conductive metal such as copper covered with an insulation layer 502, and at both ends in the longitudinal direction, the insulation layer 502 is removed to expose the conductor 501. Of the two ends of the first to sixth wires 51 to 56, one ends are motor-connecting portions 511, 521, 531, 541, 551, 561, which is connected to connecting portions 324 of coil pieces 320 respectively, and the other ends are terminal-connecting portions 512, 522, 532, 532, 542, 552, 552, 562 which are connected to the first to third terminals 57 to 59 respectively.

The conductor 501 is a single wire (i.e., solid wire) with a circular cross-sectional shape perpendicular to the longitudinal direction, and at the motor-connecting portions 511, 521, 531, 541, 551, 561, the conductor 501 is pressed into a rectangular cross-sectional shape to facilitate connection with the connecting portion 324 of the coil piece 320. The motor-connecting portions 511, 521, 531, 541, 551, 561 are connected to the connecting portions 324 of the coil pieces 320 by welding, for example, but they may also be connected by soldering.

The terminal-connecting portions 512, 522, 532, 542, 552, 562 are connected to the first to third terminals 57 to 59 respectively by caulking. The first and second wires 51, 52 have terminal-connecting portions 512, 522 which are co-tightened to the first terminal 57 to supply the U-phase current to the coil winding 32. The third and fourth wires 53, 54 have the terminal-connecting portions 532, 542 which are co-tightened to the second terminal 58 and supply the V-phase current to the coil winding 32. The fifth and sixth wires 55, 56 have the terminal-connecting portions 552, 562 which are co-tightened to the third terminal 59 and supply the W-phase current to the coil winding 32. Thus, the first and second wires 51, 52, the third and fourth wires 53, 54, and the fifth and sixth wires 55, 56 differ from each other in voltage during rotation of the electric motor 3.

The first to sixth wires 51 to 56 are partially held in the holding portion 6 between the motor-connecting portions 511, 521, 531, 541, 551, 561 and the terminal-connecting portions 512, 522, 532, 542, 552, 562. The first to sixth wires 51 to 56 are bent at right angles inside the resin mold portion 8 in the vicinity of the terminal-connecting portions 512, 522, 532, 542, 552, 562 and are led out from the holding portion 6, and the first to sixth wires 51 to 56 are aligned in a row between the holding portion 6 and the first to third terminals 57 to 59.

As shown in FIG. 2A, the direction in which the first to third terminals 57 to 59 are lined up is the X-direction, the direction parallel to the first to sixth wires 51 to 56 between the holding portion 6 and the first to third terminals 57 to 59 is the Y-direction, and the direction perpendicular to the X and Y-directions is the Z-direction.

Figure 3A:
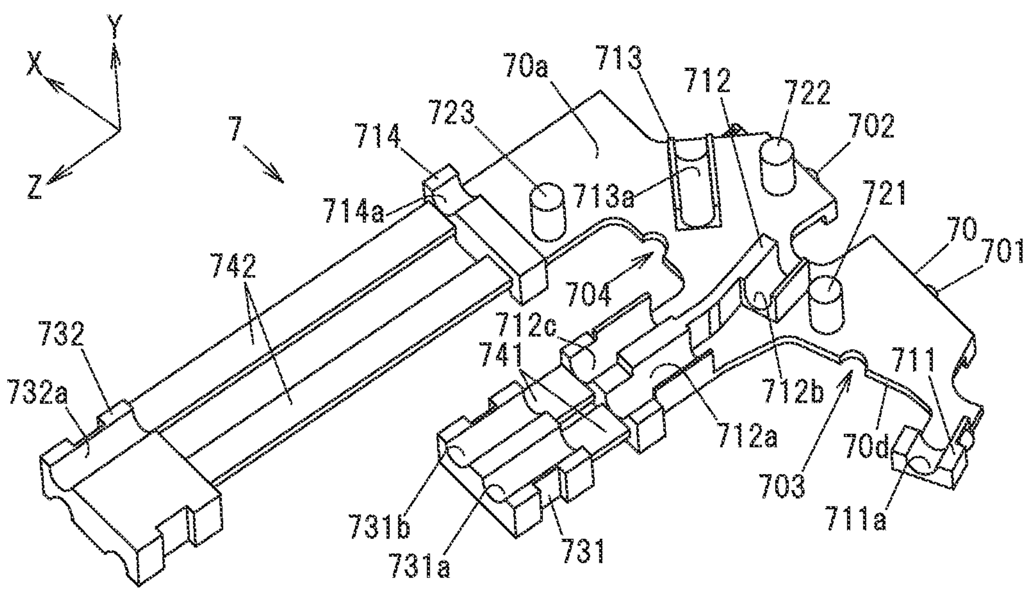
FIGS. 3A and B are perspective views showing a holder.
Figure 3B:
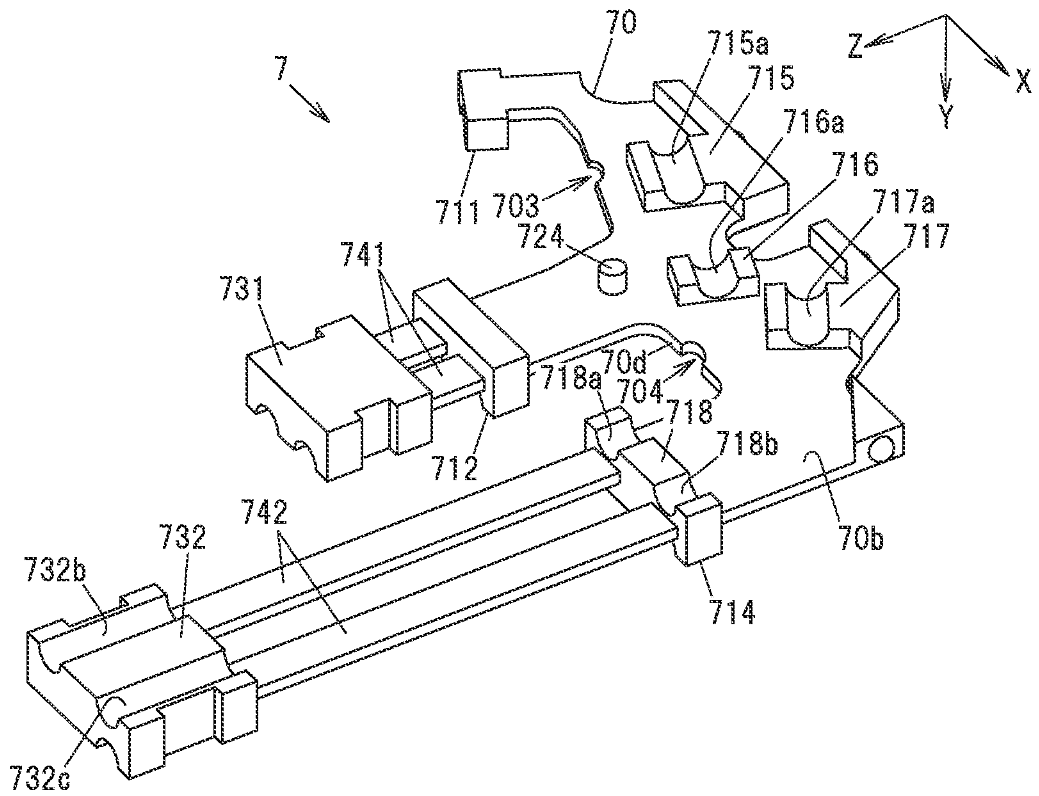

FIGS. 3A and 3B are perspective views showing the holder 7. The holder 7 is an injection-molded body made by injection molding and includes a flat substrate portion 70, first to eighth wire-holding portions 711 to 718 and first to fourth supporting portions 721 to 724 protruding in the Y-direction from the substrate portion 70, first and second land portions 731, 732 separated in the Z-direction from the substrate portion 70, and a first connecting portion 741 connecting the substrate portion 70 and the first land portion 731, and a second connecting portion 742 connecting the substrate portion 70 and the second land portion 732, in one piece.

FIG. 3A shows a one face 70*a*-side of the substrate portion 70, and FIG. 3B shows the other face 70*b*-side of the substrate portion 70, which is the back side of the one face 70*a*. The first to fourth wire-holding portions 711 to 714 and the first to third support portions 721 to 723 are provided on the one face 70*a*-side of the substrate portion 70. Fifth to eighth wire-holding portions 715 to 718 and a fourth pillar portion 724 are provided on the other face 70*b*-side of the substrate portion 70.

The first wire-holding portion 711 includes a recessed groove 711*a* for supporting the first wire 51. The second wire-holding portion 712 includes recessed grooves 712*a* and 712*b* that support the third wire 53 and a recessed groove 712*c* that supports the fifth wire 55. The third wire-holding portion 713 includes a recessed groove 713*a* that supports the fifth wire 55. The fourth wire-holding portion 714 includes a recessed groove 714*a* formed to support the sixth wire 56.

The fifth wire-holding portion 715 includes a recessed groove 715*a* that supports the second wire 52. The sixth wire-holding portion 716 includes a recessed groove 716*a* that supports the second wire 52. The seventh wire-holding portion 717 includes a recessed groove 717*a* formed to support the fourth wire 54. The eighth wire-holding portion 718 includes a recessed groove 718*a* supporting the second wire 52 and a recessed groove 718*b* supporting the fourth wire 54.

The first land portion 731 includes a recessed groove 731*a* supporting the third wire 53 and a recessed groove 731*b* supporting the fifth wire 55. The second land portion 732 includes a recessed groove 732*a* supporting the sixth wire 56, a recessed groove 732*b* supporting the second wire 52, and a recessed groove 732*c* supporting the fourth wire 54.

As shown in FIG. 2A, the resin mold portion 8 is composed of a first resin mold portion 81 formed to partially cover the substrate portion 70 and the respective portions of the first through sixth wires 51 to 56, a second resin mold portion 82 formed to surround the first land portion 731 together with the third wire 53 and the fifth wire 55, a second third resin mold portion 83 formed to surround the second land portion 732 together with the second wire 52, the fourth wire 54, and the sixth wire 56. The first to third resin mold portions 81 to 83 are formed by injecting molten resin into a cavity of a mold and allowing the resin to solidify.

The first to sixth wires 51 to 56 are bent in the thickness direction (Y-direction) of the substrate portion 70 of the holder 7 inside the first resin mold portion 81. The first wire 51, the third wire 53, the fifth wire 55, and the sixth wire 56 are located on the one face 70*a*-side of the substrate portion 70 and are bent from the one face 70*a*-side to the other face 70*b*-side. The second wire 52 and the fourth wire 54 are disposed on the other face 70*b*-side of the substrate portion 70. The second wire 52 is bent along the first wire 51 and the fourth wire 54 is bent along the third wire 53.

In FIG. 2B, the bending portions where the first to sixth wires 51 to 56 are bent inside the first resin mold portion 81 are indicated by the characters 510, 520, 530, 540, 550, 560, respectively. On an end face 70*c* of the bending portion side, which is the end of the bending portions 510, 520, 530, 540, 550, 560 in the substrate portion 70, positioning projections 701, 702 are formed for positioning the substrate portion 70 by butting against the inner surface of the cavity of the mold for molding the resin mold portion 8.

FIG. 4 is a configuration diagram showing the flow path 90 of molten resin in the mold for forming the resin mold portion 8 together with the wiring component 5. In FIG. 4, the first resin mold portion 81 is shown as a virtual line (dotted line), and its internal configuration is shown as a solid line.

The flow path 90 is composed of a single upper sprue 91 that introduces the molten resin into the mold, a runner 92 connected to the upper sprue 91, and first to fourth lower sprues 93 to 96 connected to multiple locations of the runner 92, respectively. The upper sprue 91 and the first to fourth lower sprues 93 to 96 extend perpendicularly to the substrate portion 70. The runner 92 extends parallel to the substrate portion 70. The molten resin led to the first and second lower sprues 93, 94 solidifies to become the first resin mold portion 81. The molten resin led to the third lower sprue 95 solidifies to become the second resin mold portion 82, and the molten resin led to the fourth lower sprue 96 solidifies to become the third resin mold portion 83.

As shown in FIG. 2A, the first resin mold portion 81 includes depressions 811, 812 formed in the portion into which the molten resin is injected. In the second resin mold portion 82, a depression 821 is formed in the portions into which molten resin is injected. In the third resin mold portion 83, a depression 831 is formed in the portion into which the molten resin is injected.

As shown in FIGS. 3A and 3B, first and second notches 703, 704 are formed in the substrate portion 70 corresponding to the portions into which molten resin is injected when forming the first resin mold portion 81. The first and second notches 703, 704 are formed at the edge of the substrate portion 70 which is opposite to the bending portions 510, 520, 530, 540, 550, 560 of the first to sixth wires 51 to 56. More specifically, the first and second notches 703, 704 are formed to be recessed in the Z-direction from an end face 70*d* of the substrate portion 70 which is opposite to the bending portions 510, 520, 530, 540, 550, 560.

The shape of the first and second notches 703, 704 as viewed from the Y-direction is partially circular, more specifically semi-circular. When the substrate portion 70 is viewed from the one face 70*a*-side, the first notch 703 is formed between the first wire 51 and the third wire 53, and the second notch 704 is formed between the fifth wire 55 and the sixth wire 56.

Figure 5A:
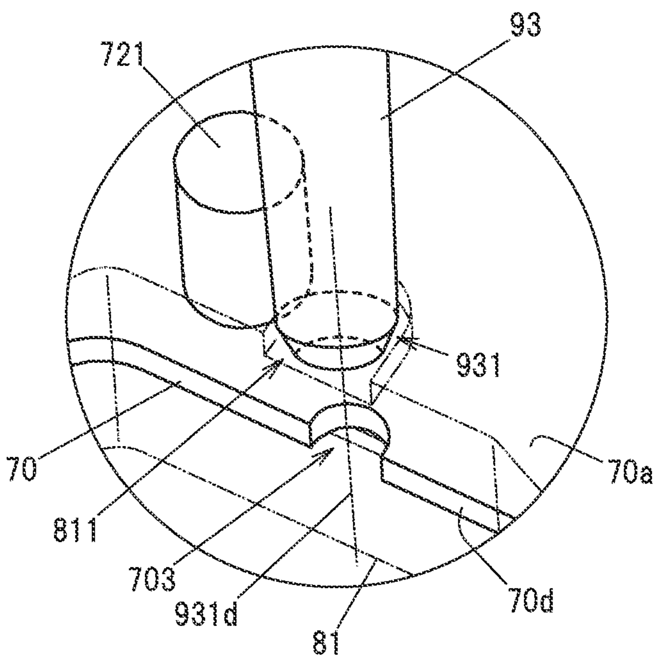
FIG. 5A is an enlarged view of the periphery of a first notch.
Figure 5B:
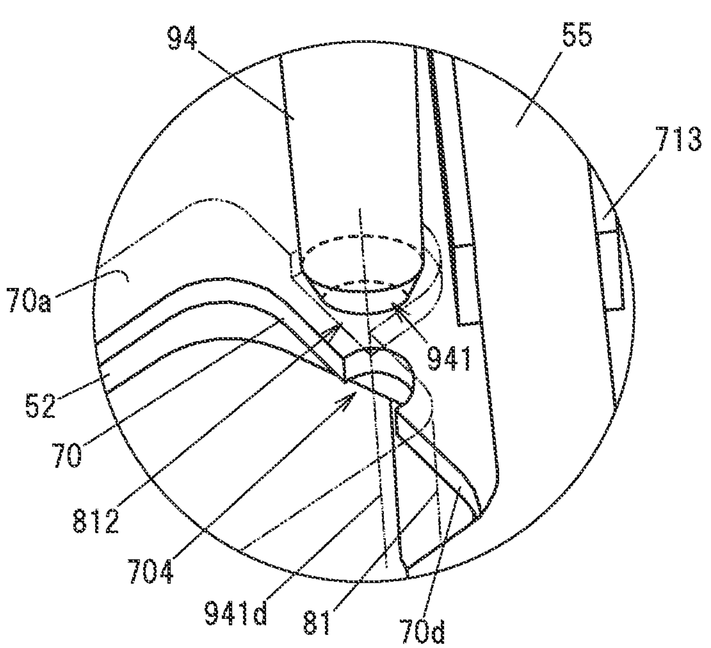
FIG. 5B is an enlarged view of the periphery of a second notch.

FIG. 5A is an enlarged view of the periphery of the first notch 703. FIG. 5B is an enlarged view of the periphery of the second notch 704. In FIGS. 5A and 5B, the first resin mold portion 81 is shown as a virtual line, and the periphery of the first and second notches 703, 704 as viewed from the direction shown in FIG. 4 are shown along with the first and second lower sprues 93, 94.

The mold with the flow path 90 includes first and second gates 931, 941, which are the entrance of the molten resin into the cavity, formed contiguously with the tips of the first and second lower sprues 93, 94, respectively. The molten resin is directed to the first and second gates 931, 941 by the flow path 90 and is injected into the cavity through the first and second gates 931, 941.

The first and second gates 931, 941 are partially conical in shape with a gradually decreasing inner diameter on the holder 7-side. The shape of the first and second gates 931, 941 allows the molten resin to be injected into the cavity with great force, and also makes it easier to separate the resin remaining in the flow path 90 and the first and second gates 931, 941 from the first resin mold portion 81 after the molten resin includes hardened.

Figure 6:
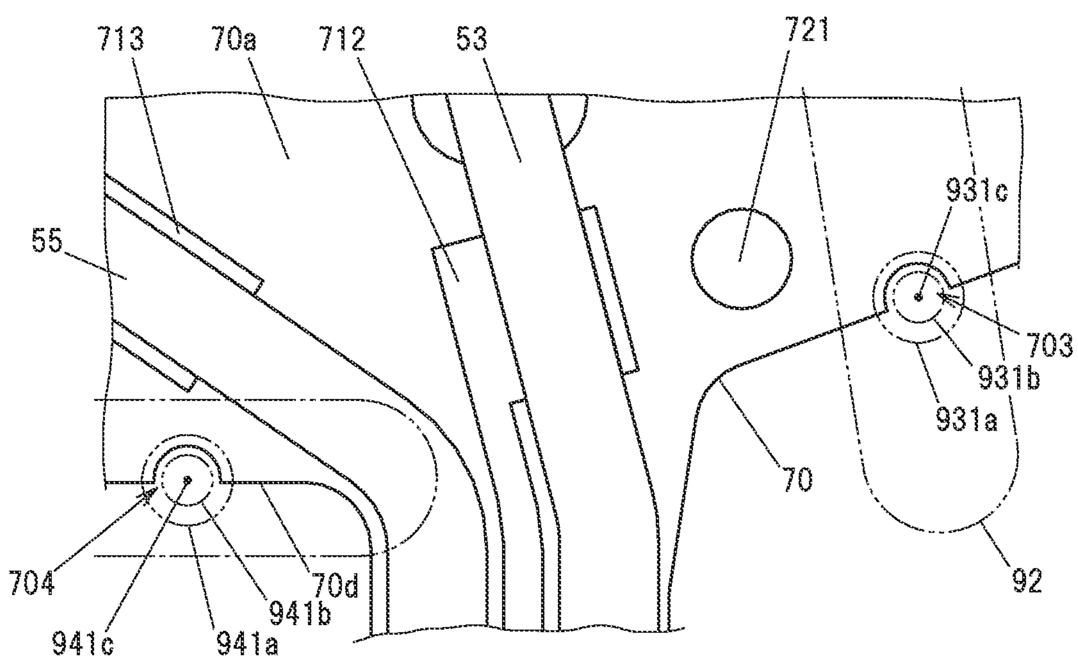
FIG. 6 is a plan view of a portion of a substrate portion including the first and second notches.

FIG. 6 is a plan view of a portion of the substrate portion 70 including the first and second notches 703, 704, viewed from the one face 70*a*-side. In FIG. 6, the runner 92 and peripheral edges 931*a*, 941*a* at base (proximal) ends of the first and second gates 931, 941 and peripheral edges 931*b*, 941*b* at tip (distal) ends of the first and second gates 931, 941 are shown as two dotted lines. The base ends of the first and second gates 931, 941 are on the large diameter end of the first and second lower sprues 93, 94, and the tip ends of the first and second gates 931, 941 are on the small diameter end of the cavity side. The peripheral edges 931*a*, 941*a* at the base ends of the first and second gates 931, 941 and the peripheral edges 931*b*, 941*b* at the tip end of the first and second gates 931, 941 are circular in shape, respectively.

The center point 931*c* of the first gate 931 and the center point 941*c* of the second gate 941 are shown in FIG. 6.

As shown in FIG. 6, the first and second notches 703, 704 are formed in a partially circular shape with a diameter larger than the diameter of the tips of the first and second gates 931, 941. As mentioned above, the first and second lower sprues 93, 94 extend perpendicularly to the substrate portion 70, so that molten resin is injected into the cavity of the mold from the first and second gates 931, 941 in a direction perpendicular to the substrate portion 70, that is, perpendicular to the paper surface in FIG. 6.

As shown in FIG. 6, when the substrate portion 70 is viewed from the first and second gates 931, 941 side along the direction perpendicular to the substrate portion 70, the peripheral edges 931*b*, 941*b* of the tip ends of the first and second gates 931, 941 do not intersect the substrate portion 70. Also, extensions 931*d*, 941*d* (see FIGS. 5A and 5B) in the direction of molten resin flow through center points 931*c*, 941*c* of the first and second gates 931, 941 do not intersect the substrate portion 70. This configuration prevents the flow pressure of the molten resin ejected from the first and second gates 931, 941 from acting directly on the substrate portion 70.

Figure 7:
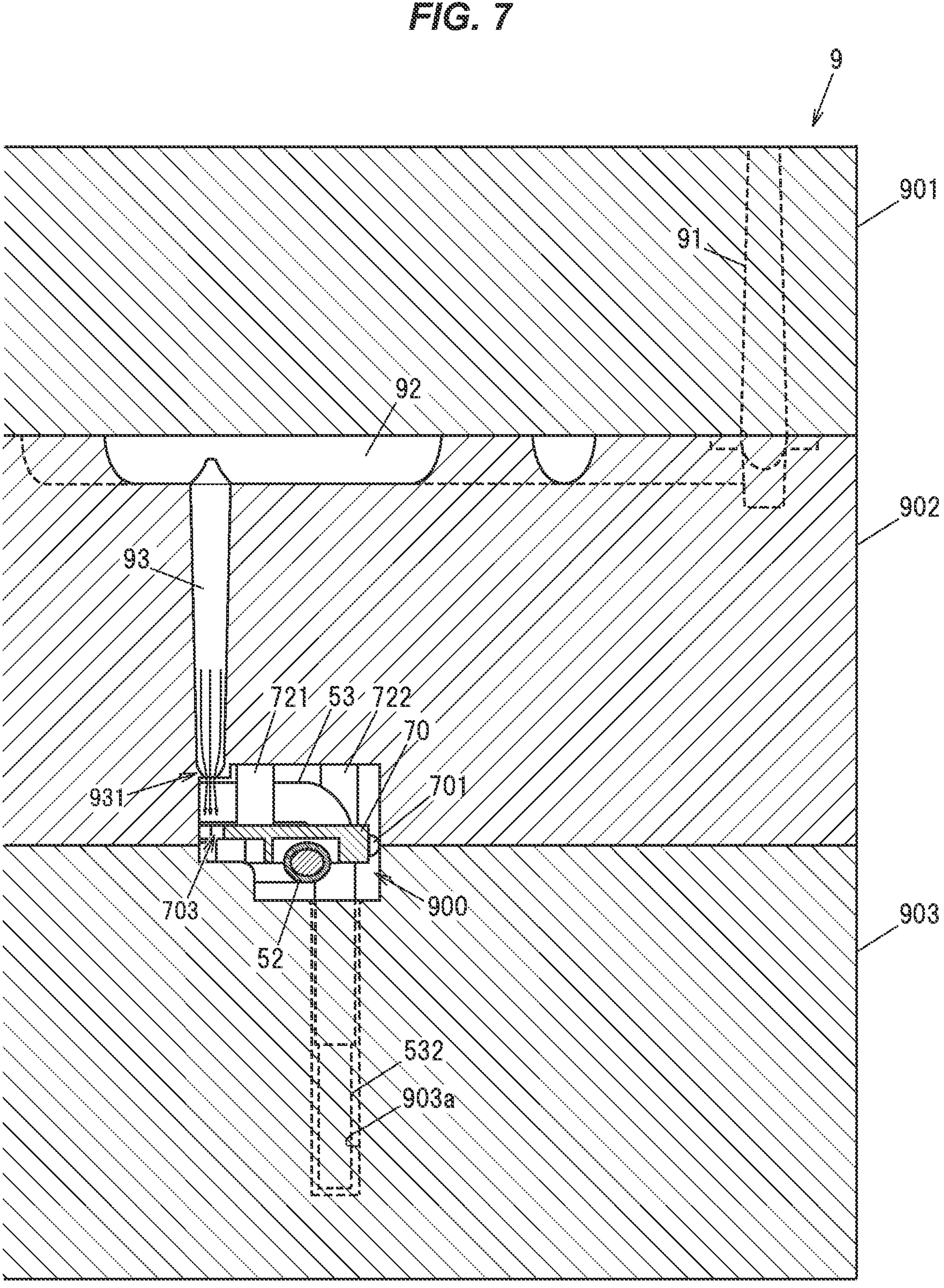
FIG. 7 is a partial cross-sectional view of the mold for forming the resin mold portion, and the holder and the like being disposed in a cavity of the mold.
Figure 8:
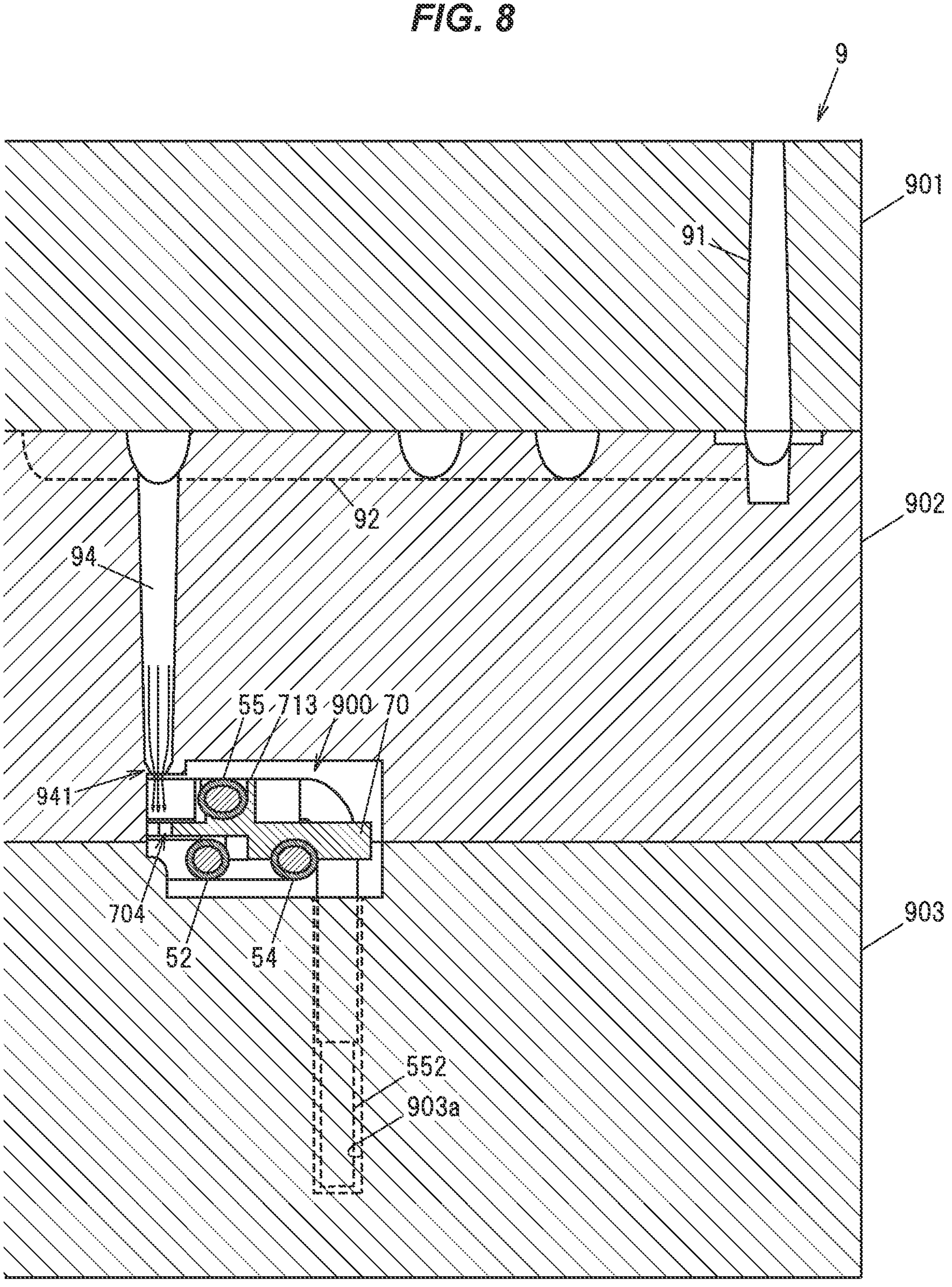
FIG. 8 is a partial cross-sectional view of the mold for forming the resin mold portion and the holder and the like being disposed in the cavity of the mold.

FIGS. 7 and 8 are partial cross-sectional views showing the mold 9 for forming the resin mold portion 8, and the holder 7 and the like being disposed in a cavity 900 of the mold 9. FIG. 7 shows a cross-section perpendicular to the X-direction including the first notch 703, and FIG. 8 shows a cross-section perpendicular to the X-direction including the second notch 704.

The method of manufacturing the wiring component 5 includes a placement step in which the first to sixth wires 51 to 56 and the holder 7 are placed in the cavity 900 of the mold 9, and a molding step in which the molten resin is injected into the cavity 900 and molding is performed. In the placement step, the first to sixth wires 51 to 56 are supported by the first to eighth wire-holding portions 711 to 718 and the first and second land portions 731, 732 formed on the substrate portion 70 of the holder 7.

In the molding step, molten resin is injected toward the portions where the first and second notches 703, 704 are formed to form the first resin mold portion 81. In the molding step, molten resin is injected from the third lower sprue 95 to form the second resin mold portion 82, and molten resin is injected from the fourth lower sprue 96 to form the third resin mold portion 83. In FIGS. 7 and 8, the flow of molten resin in the vicinity of the first and second gates 931, 941 is indicated by three arrows.

In the molding step, the molten resin flows from the one face 70*a*-side to the other face 70*b*-side of the substrate portion 70 through the first notch 703 and the second notch 704. In other words, the first notch 703 and the second notch 704 facilitate the flow of molten resin from the other face 70*b*-side of the substrate portion 70.

The mold 9 includes a first split mold 901, a second split mold 902, and a third split mold 903, with the cavity 900 formed between the second split mold 902 and the third split mold 903. The second split mold 902 is positioned between the first split mold 901 and the third split mold 903. Hereinafter, the overlapping direction of the first split mold 901, the second split mold 902, and the third split mold 903 is the vertical direction, the side of the first split mold 901 to the second split mold 902 is the upper side, and the side of the third split mold 903 to the second split mold 902 is the lower side.

The holder 7 is secured in the cavity 900 with first to third pillar portions 721 to 723 abutting the lower surface of the second split mold 902 and a fourth pillar portion 724 abutting the upper surface of the third split mold 903.

A runner 92 is formed between the first split mold 901 and the second split mold 902. An upper sprue 91 is formed through the first split mold 901 in a vertical direction, and the lower end of the upper sprue 91 is connected to the runner 92. The first to fourth lower sprues 93 to 96 are formed through the second split mold 902 in the vertical direction, and the respective upper ends of the first to fourth lower sprues 93 to 96 are connected to the runner 92. The molten resin supplied from the upper end of the upper sprue 91 flows into the runner 92 and is distributed by the runner 92 to the first to fourth lower sprues 93 to 96.

The first to sixth wires 51 to 56 placed in the cavity 900 in the placement step are bent in the thickness direction of the substrate portion 70 at the bending portions 510, 520, 530, 540, 550, 560 beforehand, and the terminal-connecting portions 512, 522, 532, 542, 552, 562 are housed in a plurality of recesses 903*a* formed in the third split mold 903. FIG. 7 shows the terminal-connecting portion 532 of the third wire 53 accommodated in the recesses 903*a*, and FIG. 8 shows the terminal-connecting portion 552 of the fifth wire 55 accommodated in the recesses 903*a*. The recess 903*a* is continuous with the cavity 900 and extends downward from the cavity 900.

As shown in FIGS. 7 and 8, the recess 903*a* is formed at a position farthest from the first and second gates 931, 941. This lowers the flow pressure of the molten resin in the periphery of the recesses 903*a* in the cavity 900 and prevents the molten resin from entering the recesses 903*a*.

Functions and Effects of the Embodiment

According to the embodiment described above, the first and second notches 703, 704 are formed in the substrate portion 70 of the holder 7 in the portion corresponding to the first and second gates 931, 941, i.e., the portion most strongly affected by the flow pressure of the molten resin if the first and second notches 703, 704 were not formed, so it is possible to suppress the occurrence of displacement and distortion of the holder 7 in the cavity 900 due to the flow pressure of the molten resin when forming the resin mold portion 8. This results in a wiring component 5 in which the first to sixth wires 51 to 56 are held in the holding portion 6 in a predetermined positional relationship.

Modified Example

Figure 9:
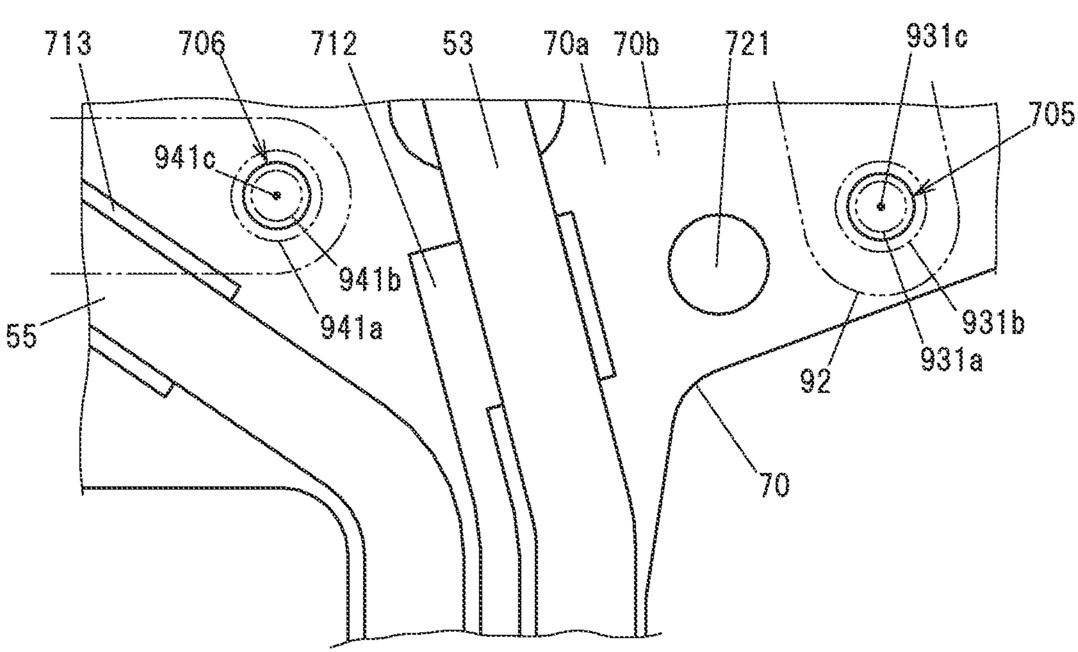
FIG. 9 is an explanatory diagram showing the configuration of the holder according to a modified example and the positional relationship between the holder and first and second gates.

FIG. 9 is an explanatory diagram showing a configuration of a holder 7A according to a modified example and the positional relationship between the holder 7A and the first gate 931 and the second gate 941. In the above embodiment, the case in which the partially circular first and second notches 703, 704 are formed at the edge of the substrate portion 70 is described, but in the modified example shown in FIG. 9, instead of the first and second notches 703, 704, first and second through-holes 705, 706 that pass through the substrate portion 70 of the holder 7A in the thickness direction are formed. Other configurations are the same as in the above embodiment.

In the molding step using this holder 7A, as in the above embodiment, molten resin is injected from the first and second gates 931, 932 into the cavity 900 along a direction perpendicular to the substrate portion 70, and flows through the first and second through-holes 705, 706, from the one face 70*a*-side of the substrate portion 70 to the other face 70*b*-side.

The first through-hole 705 is formed at a position corresponding to the first gate 931, i.e., aligned with the first gate 931 in the thickness direction of the substrate portion 70. The second through-hole 706 is formed at a position corresponding to the second gate 941, i.e., aligned with the second gate 941 in the thickness direction of the substrate portion 70. The shape of the first and second through-holes 705, 706 viewed in the thickness direction of the substrate portion 70 is circular with a diameter larger than the diameter of the tips of the first and second gates 931, 941. However, the shape of the first and second through-holes 705, 706 is not limited to a circular shape, but may be an oval or polygonal shape, for example.

As shown in FIG. 9, the extension of the molten resin flow direction (perpendicular to the substrate portion 70) through the center points 931*c*, 941*c* of the first and second gates 931, 941 does not intersect the substrate portion 70. Also, when looking at the substrate portion 70 from the first and second gates 931, 941 side along the direction perpendicular to the substrate portion 70, the peripheral edges 931*b*, 941*b* of the tip ends of the first and second gates 931, 941 do not intersect the substrate portion 70. This configuration prevents the flow pressure of the molten resin ejected from the first and second gates 931, 941 from acting directly on the substrate portion 70.

Even when the holder 7A according to the modified example is used, it is possible to suppress displacement and distortion of the holder 7A in the cavity 900 of the holder 7A due to the flow pressure of the molten resin when forming the resin mold portion 8, as in the above embodiment. This results in the wiring component 5 in which the first to sixth wires 51 to 56 are held in the holding portion 6 in a predetermined positional relationship.

Summary of the Embodiment

Next, the technical concepts that can be grasped from the above-described embodiment will be described with the aid of the characters in the embodiment. However, each character in the following description is not limited to the parts, etc. specifically shown in the embodiment as component within the scope of the claims.

According to the first feature, a wiring component 5, includes a plurality of electric wires 51 to 56 and a holding portion 6 that batch holds respective portions of the plurality of electric wires 51 to 56, the holding portion 6 including a holder 7, 7A that supports the plurality of electric wires 51 to 56 in a predetermined positional relationship, and a resin mold portion 8 composed of resin molded to cover the holder 7, 7A and the respective portions of the plurality of electric wires 51 to 56, the holder 7, 7A including a substrate portion 70 and a plurality of wire-holding portions 711 to 718 formed protruding from the substrate portion 70, the plurality of electric wires 51 to 56 being supported by the plurality of wire-holding portions 711 to 718, respectively, a notch 703, 704 or a through-hole 705, 706 being formed in the substrate portion 70 corresponding to a portion into which molten resin is injected when forming the resin mold portion 8.

According to the second feature, in the wiring component 5 as described in the first feature, the plurality of electric wires 51 to 56 are bent inside the resin mold portion 8 in a thickness direction of the substrate portion 70 of the holder 7, and the notch 703, 704 is formed at an end of the substrate portion 70 that is opposite to the bending portions 510, 520, 530, 540, 550, 560 in which the plurality of electric wires 51 to 56 are bent.

According to the third feature, a method for manufacturing a wiring component 5 including a plurality of electric wires 51 to 56 and a holding portion 6 including a holder 7, 7A supporting the plurality of electric wires 51 to 56 in a predetermined positional relationship and molded with resin covering respective portions of the plurality of electric wires 51 to 56, includes a placement step for placing the plurality of electric wires 51 to 56 and the holder 7 in a cavity 900 of a mold 9, a molding step for injecting molten resin into the cavity 900 to perform the molding, wherein the holder 7, 7A including a substrate portion 70 and a plurality of wire-holding portions 711 to 718 formed protruding from the substrate portion 70 and formed with a notch 703, 704 or a through-hole 705, 706 in the substrate portion 70 is used as the holder 7, 7A, wherein the plurality of electric wires 51 to 56 are supported by the plurality of wire-holding portions 711 to 718 in the placement step, and the molten resin is injected toward a portion where the notch 703, 704 or the through-hole 705, 706 is formed in the molding step.

According to the fourth feature, in the method as described in the third feature, a gate 931, 941 that serves as an entrance of the molten resin into the cavity 900 and a flow path 90 that guides the molten resin to the gate 931, 941 are formed in the mold 9, and an extension 931D, 941D in a direction of flow of the molten resin passing through a center of the gate 931, 941 does not intersect the substrate portion 70.

According to the fifth feature, in the method as described in the fourth feature, the molten resin is injected into the cavity 900 in the molding step from the gate 931, 941 in a direction perpendicular to the substrate portion 70, and when viewed at the substrate portion 70 from the gate 931, 941 side along the direction perpendicular to the substrate portion 70, a peripheral edge 931*b*, 941*b* of a tip end of the gate 931, 941 does not intersect the substrate portion 70.

According to the sixth feature, in the method as described in the fifth feature, wherein the tip end of the gate 931, 941 is circular and the notch 703, 704 is formed in a partial circular shape with a diameter larger than the diameter of the tip end of the gate 931, 941.

According to the seventh feature, in the method as described in the third feature, wherein some wires 51, 53, 55, 56 of the plurality of electric wires 51 to 56 are placed on one face 70*a*-side of the substrate portion 70, and wherein some other wires 52, 54 of the plurality of electric wires 51 to 56 are placed on the other face 70*b*-side of the substrate portion 70, and the molten resin flows from the one face 70*a*-side to the other face 70*b*-side through the notch 703, 704 or the through-hole 705, 706 in the molding step.

According to the eighth feature, in the method as described in any of the third to seventh features, the plurality of electric wires 51 to 56 are bent in a thickness direction of the substrate portion 70 within the cavity 900, and wherein the notch 703, 704 is located at an end of the substrate portion 70 on a side opposite to the bending portions 510, 520, 530, 540, 550, 560 where the plurality of electric wires 51 to 56 are bent.

The above described embodiment and modifications of the invention are not limiting the invention as claimed above. It should also be noted that not all of the combinations of features described in the embodiments are essential to the means for solving the problems of the invention.

The invention claimed is:

1. A method for manufacturing a wiring component including a plurality of electric wires and a holding portion including a holder supporting the plurality of electric wires in a predetermined positional relationship and molded with resin covering respective portions of the plurality of electric wires, the method comprising:

a placement step for placing the plurality of electric wires and the holder in a cavity of a mold; and a molding step for injecting molten resin into the cavity to perform the molding, wherein the holder including a substrate portion and a plurality of wire-holding portions formed protruding from the substrate portion and formed with a notch or a through-hole in the substrate portion is used as the holder, wherein the plurality of electric wires are supported by the plurality of wire-holding portions in the placement step, and the molten resin is injected toward a portion where the notch or the through-hole is formed in the molding step.

2. The method, according to claim 1, wherein a gate that serves as an entrance of the molten resin into the cavity and a flow path that guides the molten resin to the gate are formed in the mold, and wherein an extension in a direction of flow of the molten resin passing through a center of the gate does not intersect the substrate portion.

3. The method, according to claim 2, wherein the molten resin is injected into the cavity in the molding step from the gate in a direction perpendicular to the substrate portion and when viewed at the substrate portion from a gate side along the direction perpendicular to the substrate portion, a peripheral edge of a tip end of the gate does not intersect the substrate portion.

4. The method, according to claim 3, wherein the tip end of the gate is circular and the notch is formed in a partial circular shape with a diameter larger than a diameter of the tip end of the gate.

5. The method, according to claim 1, wherein some wires of the plurality of electric wires are placed on one face-side of the substrate portion, and wherein some other wires of the plurality of electric wires are placed on an other face-side of the substrate portion, and the molten resin flows from the one face-side to the other face-side through the notch or the through-hole in the molding step.

6. The method, according claim 1, wherein the plurality of electric wires are bent in a thickness direction of the substrate portion within the cavity, and wherein the notch is located at an end of the substrate portion on a side opposite to bending portions where the plurality of electric wires are bent.

* * * * *